United States Patent [19]

Durham

[11] Patent Number: 4,555,448

[45] Date of Patent: Nov. 26, 1985

[54] BIOGENETIC SILICA INSULATION

[75] Inventor: Robert L. Durham, Simonton, Tex.

[73] Assignee: Agritec, Inc., Houston, Tex.

[21] Appl. No.: 629,396

[22] Filed: Jul. 10, 1984

Related U.S. Application Data

[63] Continuation-in-part of Ser. No. 470,748, Feb. 28, 1983, abandoned, which is a continuation-in-part of Ser. No. 297,820, Aug. 31, 1981, abandoned.

[51] Int. Cl.$^4$ .......................... B32B 5/16; B32B 9/00; C08J 9/00
[52] U.S. Cl. ................................ 428/402; 428/304.4; 428/331; 521/122; 521/906
[58] Field of Search ....................... 428/68, 69, 71, 74, 428/304.4, 312.2, 312.6, 317.9, 323, 326, 331, 402, 403; 521/122, 906; 52/309.15, DIG. 9; 527/313

[56] References Cited

U.S. PATENT DOCUMENTS

| | | | |
|---|---|---|---|
| 3,309,444 | 3/1967 | Schueler | 428/326 |
| 3,554,941 | 1/1971 | Varnell | 428/323 |
| 3,676,208 | 7/1972 | Griffin | 428/149 |
| 3,985,198 | 10/1976 | Kurtze et al. | 428/304.4 |
| 4,122,203 | 10/1978 | Stahl | 428/328 |
| 4,164,526 | 8/1979 | Clay et al. | 428/317.9 |
| 4,238,374 | 12/1980 | Durham et al. | 527/313 |

FOREIGN PATENT DOCUMENTS 2847807  5/1979  Fed. Rep. of Germany ...... 428/323

*Primary Examiner*—William J. Van Balen
*Attorney, Agent, or Firm*—Fulbright & Jaworski

[57] ABSTRACT

The invention is directed to insulation, methods of insulation, and methods of making insulation with biogenetic silica particles in amorphous state and having a substantially porous skeletal structure. The insulation is not compacted or densified.

22 Claims, No Drawings

BIOGENETIC SILICA INSULATION

REFERENCE TO RELATED APPLICATION

The present application is a continuation-in-part of application Ser. No. 470,748, filed Feb. 28, 1983, abandoned in favor of this application, which in turn is a continuation-in-part of application Ser. No. 297,820 filed Aug. 31, 1981, abandoned in favor of application Ser. No. 470,748.

BACKGROUND OF THE INVENTION

A number of lightweight granules or particles are presently used in various insulation materials, such as perlite, cabisil, diatomaceous earth, phenolic spheres and silica aerogel. None of these granules or particles presently in use has comparable physical properties of biogenetic silica in amorphous state with a substantially porous skeletal structure, particularly the pore sizes, pore volume and general open structure of the material. Biogenetic silica in amorphous state and having a substantially porous structure is unique since it is inorganic, has an extreme temperature range without changing its physical properties and is better at resisting heat flow than the other aggregates or particles currently in use. When tested for thermal conductivity and thermal resistance, these prior granules and particles are about 20% less efficient than biogenetic silica. In addition, while asbestos fibers provide good insulation, health problems occur in handling, applying, and using asbestos, such as asbestosis.

PRIOR ART STATEMENT

U.S. Pat. No. 4,232,374, issued Dec. 9, 1980, discloses a bound aggregate composition utilizing rice hull ash and a binder. This composition is not a rigid composition and can be easily crumbled manually.

U.S. Pat. No. 3,555,491, issued Jan. 12, 1971, discloses a concrete product comprising a mixture of rice hulls, polyester resin, and finely-divided inorganic particles. While the chemical composition of rice hull ash is set forth in this patent, there is no suggestion that rice hull ash should or could be used in this composition, but only rice hulls.

German Pat. No. 2,847,807 discloses insulating board products made of a mixture of rice hull ash, perlite and a fibrous mineral wool shaped and bonded with a phosphatic bonding agent under pressure into a dense slab or brick.

U.S. Pat. No. 4,164,526 discloses a molded composition having a cellular core and a thick and substantially densified outer layer. In molding, the mold cavity is charged with the admixture and foam occurs with the mold closed. Filler materials include fly ash, calcium carbonate, silicon dioxide, and oxides of iron.

U.S. Pat. No. 4,122,203, issued Oct. 24, 1978, discloses a foamed polymeric material coated with a thermal barrier composed of a flowable or sprayable synthetic resinous material.

U.S. Pat. No. 3,985,198, issued Oct. 12, 1976, discloses a sound deadening system comprising a laminate of a covering stratum of closed-cell soft foam and a core stratum having cavities and joined to the covering stratum at locations spaced from one another at specific locations.

U.S. Pat. No. 3,309,444, issued March 14, 1967, discloses the use of wood wastes and other fibrous materials in the manufacture of board or shaped molded rigid articles.

U.S. Pat. No. 3,676,208, issued July 11, 1972, discloses an anti-slip surface composed of a hardened fiber having raised individual anti-skid islands consisting of smooth-surfaced, solid spheres, such as glass beads.

Rice hull ash has been used as a topping in making steel.

Applicant is not aware of any art teaching the use of undensified or uncompacted porous biogenetic silica particles in which the fibers have been removed in insulation materials and methods in which the resulting insulation has a porosity of at least about 60% by volume and in which heat transfer bridges are not formed.

SUMMARY

The present invention is directed to insulation, methods of insulation, and methods of making insulation with biogenetic silica particles in substantial amorphous state and having a substantially porous skeletal structure free of fibrous material. The insulation is not compacted or densified and has a minimum porosity of about 60% up to about 85% by volume thus trapping and serving as a reservoir for about the same amount of air, and is free of heat transfer channels. Presently, the preferred biogenetic silica is rice hull ash, although biogenetic silica particles obtained from cell structure of plant species that are relatively high in biogenetic silica can be used either alone or in combination with rice hull silica particles, such as ash. These include particles of rice stalks, equisetum (horsetail weeds), certain bamboos and palm leaves, particularly palmyra polon, and the like, all of which when their fibrous material is removed, such as by burning or decomposition, leave highly porous particles having physical properties which make them an excellent insulation or insulation material.

A variety of highly desirable insulation products are possible with biogenetic silica particles, such as ash, in amorphous state and in substantially porous form. These include free-flowing porous biogenetic particles, undensified porous biogenetic particles bound together in the form of panels or other physical shapes or cast with suitable adhesive binders, as hereinafter set forth, into a particular configuration.

The present invention in another of its aspects are methods of applying or otherwise insulating with undensified biogenetic silica particles, such as ash, in amorphous state and having a porous structure of at least about 60% by volume. This is accomplished by flowing these particles into various cavities or spaces in structures, between walls, and against surfaces to be held against the surfaces as subsequently described. These particles can be free-flowing or can be combined with suitable adhesive binders, as hereinafter defined.

The present invention in still another of its aspects is the forming of biogenetic silica particles in amorphous state and having a substantially porous structure into undensified structures and shapes having at least 60% porosity by physical binders or incorporating the biogenetic silica particles in undensified foamed materials, such as urethane foams.

Accordingly, it is an object of the present invention to provide insulation and methods of insulation employing particles of biogenetic silica in amorphous state and having a substantially porous form; that is, a porosity of at least about 60% by volume.

It is a further object of the present invention to provide insulation by depositing biogenetic silica particles in amorphous state and in substantially porous form into spaces or on surfaces where insulation is needed or desired without substantial compaction or densification.

A further object of the present invention is the provision of an insulation and a method of insulating using rice hull ash in amorphous state and having a substantially porous skeletal form, the rice hull ash having its porosity substantially unchanged and not densified.

A further object of the present invention is the provision of a method of insulating comprising flowing such biogenetic silica particles, with or without a physical and chemically non-reactive binder to the particles, into spaces or cavities between walls of structures, vessels, tanks, and the like without densification or compaction of the biogenetic silica particles.

A further object of the present invention is the provision of insulation comprised of biogenetic silica particles in amorphous state and in substantially porous and undensified form bound together by water-soluble, non-chemically reactive binders into a board or other suitable shapes as desired.

A further object of the present invention is the provision of a method of insulating various surfaces, such as pipes, vessels, containers and the like by spraying biogenetic silica particles in amorphous state and in substantially porous and undensified form with a water-soluble, non-chemically reactive bonding agent to the particles for bonding the biogenetic silica against the surfaces.

A further object of the present invention is the provision of methods of making insulation with such biogenetic silica by binding porous particles of silica together with water-soluble adhesive type binders or incorporating the porous silica particles in other materials, such as urethane foams, without densification of the particles and without substantial filling of the pores of the ash thereby providing a porosity of at least about 60% by volume, and without forming heat transfer bridges.

A further object is the provision of insulation, its methods of manufacture and insulation which is economical and which poses no health problems in its methods of manufacture, application and use.

Other and further objects, features and advantages appear throughout the specification and claims.

DESCRIPTION OF PRESENTLY PREFERRED EMBODIMENTS

A number of lightweight granules or particles are presently used in various insulation materials. These include perlite, cabisil, diatomaceous earth, phenolic spheres, silica aerogel, asbestos fibers and the like. Asbestos fibers have been widely used as insulating material, however, the use of these fibers as insulation has caused asbestosis. The present invention is directed to undensified insulating material containing particles of highly porous biogenetic silica free of fibrous material and methods of insulation which are relatively cheap and inexpensive, which have very high porosity thus trapping relatively large volumes of air in the pores resulting in improved thermal resistance or enhanced insulation ability, and which do not cause any physical injury or harm to the manufacturers, applicators or users of the insulation.

The presently preferred biogenetic silica is rice hull ash. Rice hulls are high in silica content, containing about 18-22% by weight, with a porous skeletal silical structure having approximately 75-80% open or void spaces. In addition, it has been a continuing problem for the Rice Industry to dispose of rice hulls and, while a number and variety of uses for rice hulls and rice hull ash have been proposed and used, large volumes of rice hulls are burned, and their ash is disposed of by the Rice Industry at great expense.

While rice hull ash, either by burning or decomposition, is preferred, other biogenetic silica particles can be used, such as particles from the cell structure of rice stalks, equisetum (horsetail weeds), certain bamboo palm leaves, particularly palmyra polon and the like.

It is essential that all or substantially all fibrous material be removed from the biogenetic silica particle as the fibrous material substantially reduces the porosity and hence the volume of air trapped resulting in substantially reduced insulating qualities.

Biogenetic silica in amorphous state and in substantially porous form free or substantially free of fibrous material can be obtained either by burning or decomposition. While porous biogenetic silica can be ground into particles, advantageously these materials form porous silica particles on burning or decomposition.

Commercially available rice hull ash is prepared by burning rice hulls in a furnace. In the process, raw rice hulls are continually added to the top of the furnace and ash free of fibrous material is continuously removed from the bottom. Temperatures in the furnace range from about 800° to about 1400° C., and the time factor for the ash in the furnace is about three minutes. Upon leaving the furnace, the ash is rapidly cooled to provide ease in handling. When treated by this method, the silica remains in a relatively pure amorphous state rather than the crystalline forms known as tridymite or crystobalite. This transition from the amorphous to the crystalline state generally takes place when the silica is held at very high temperatures, for example 2000° C., for longer periods of time. The significance of having the silica in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as the fibrous material is removed and the ash is in an amorphous state.

The amount of open or void spaces in the biogenetic silica ash depends on the amount of fines in the ash. The inclusion of fines is not deleterious; however, the more porous the ash the better the insulating qualities of the insulation.

Biogenetic silica in amorphous state and substantially porous skeletal form has a number of factors which make it highly desirable as insulation or as an insulation material. First, since it is an amorphous form of silica, it does not cause silicosis thus reducing cautionary handling procedures. Secondly, it is highly porous, for example, rice hull ash has approximately 75-80% open or void spaces, so that air is trapped in these spaces enhancing insulation properties. Thirdly, it is a fire retardant, and, fourthly, it is dimensionally stable at low and high temperatures, thus rendering it useful at elevated temperatures without structural change. At either very low or very high temperatures such biogenetic silica ash has good insulating properties. In the present invention, the porosity is not decreased, which would be the case if foamed under external confinement or pressure which densifies the particles, thereby retaining air spaces and avoiding thermal bridges.

One aspect of the invention is a method of insulating by depositing or free flowing biogenetic silica ash particles in amorphous state and having a substantially porous skeleton into spaces or cavities in double wall constructed vessels, concrete blocks or other construction blocks or structures used in constructing buildings, homes and other structures, or between walls of such structures, without compaction to the extent that the porosity of the biogenetic silica is substantially reduced.

One such application is the method of depositing biogenetic silica ash particles in cryogenic vessels. This method comprises filling the cavity formed by a double wall constructed vessel with these particles. Air is then evacuated from the porous particles by vacuum techniques common to the trade. This results in very little compaction and provides a porosity of between about 60% and 85% by volume. Such insulation is superior to rigid insulation in this particular application because the biogenetic silica ash reduces both convection and radiation heat flow, resists heat flow in the event of vacuum failure, and the "R" factor for biogenetic silica ash is superior to other currently used and tested insulating particles or powders.

Another aspect of the present invention is the provision of a rigid panel or molded configuration including particles of biogenetic silica in amorphous state and having a substantially porous skeleton structure, such as rice hull ash. To make such a rigid panel or molded configuration, a water-soluble binder is used which does not react chemically with the biogenetic silica particles, and no pressure is used, or the particles are incorporated into the structure of another material in such a manner that does not alter the porosity of the porous silica particles.

One example of incorporating porous biogenetic silica particles into another material is by blending it into urethane chemicals when they are mixed and just before foaming occurs. This is accomplished by using a metering screw flite to introduce a biogenetic silica ash into a pug mill immediately after isocyanate and polyols are mixed to form urethane. This final mixture is slowly fed onto a conveyor and allowed to react forming a continuous foamed bun. No confinement or external pressure is used which would reduce the porosity or densify the resulting bun. The rigid bun preferably contains about 40% by weight of the biogenetic silica particles distributed uniformly throughout its structure, although the biogenetic silica particles can range from about 10% to about 60% by weight of the bun. The resulting bun has a porosity between about 60% to 85% by volume depending on the quantity and type of biogenetic silica particles incorporated into the foamed bun and the amount of binder used.

Surprisingly, a three-inch thick specimen of this rigid panel (40% by weight rice hull ash) tested by a commercial testing laboratory had a thermal resistance (R) of 10.7293 which is similar to unadulterated urethane foam of this type. This is surprising since the addition of a foreign substance in this quantity normally greatly reduces the thermal resistance. Since the biogenetic silica particles, such as rice hull ash, are considerably less expensive than the urethane chemicals, a foam is produced having good thermal resistance at a relatively low price. In addition, the biogenetic silica particles are flame retardant, and the urethane panel with biogenetic silica particles in it is less supportive of combustion.

The binders must not materially alter the porosity of the porous biogenetic silica particles, such as rice hull ash. Binders which react chemically with these particles are unsatisfactory since they form transport bridges for heat flow through the particles thereby reducing the insulation value of the final insulation product. The preferred binders are those which are soluble in water and which can be added in a dilute aqueous mixture and then shaped into the desired shape without substantial compaction or densification. The water drys leaving bonds that pull the particles together without compaction or densification. These include the epoxy cements, cross-linked polyvinyl alcohol and polyacrylamide and other cross-linked polymers with adhesive properties. In addition, some of the newer copolymers such as acrytonitrile-starch graft copolymers when mixed with water and the biogenetic silica particles have good adhesive properties when dried. These copolymers are particularly suitable and provide a good binder for packing biogenetic silica particles in double walls. When the material dries, the copolymer pulls these particles together without compacting or densifying them thus giving excellent insulation properties and without forming heat transfer bridges.

In addition, conventional adhesives can be used such as derivatives of polyvinyl alcohol, methylcellulose, acrylates and dextrins, starches and casein are all binders which produce solid forms with the biogenetic silica particles without destroying or impairing their insulating qualities.

The adhesive content should be kept below 5% by weight of the total biogenetic silica particles to avoid filling voids in their porous skeletons which if filled would thus decrease porosity and increase heat conductivity.

Insulation boards or solid structures made by binding porous biogenetic silica particles with such binders have a thermal resistance about 15-20% higher than those made with other aggregates or particles and the binder. In addition, bound porous biogenetic silica particles are also more flame retardant than the other aggregates bound together.

Another aspect of the present invention is the method of spraying biogenetic silica particles, such as rice hull ash, in porous form onto a surface, such as pipes, vessels, walls of buildings and the like, combined with up to about 5% of a binder or adhesive which will adhere to the surface which when dry physically binds the porous biogenetic silica particles to the surface without substantial compaction. Such binders include commercial epoxy cement, as well as other adhesives, and preferably viscous adhesives which will not fill voids of the biogenetic silica. As previously mentioned, binders which react chemically with the particles of biogenetic silica are unsatisfactory as they form heat transfer bridges and materially affect the porosity of the biogenetic silica particles. Advantageously, there is no compaction or densification of the insulation thereby trapping large volumes of air and thus providing improved insulation qualities.

In some methods of insulating, while using a binder, it is advantageous to have the biogenetic silica particles in amorphous state with a substantially porous structure in a form in which it can be flowed or sprayed onto a surface or into cavities or voids in structures. Binders which can be used for this purpose include the water-soluble polymers and any cross-linked species of a polymer whose linear analogue is water soluble. For a description of such binders suitable for binding biogenetic silica particles, reference is made to U.S. Pat. No. 4,238,374. Advantageously, these binders do not chemically react with the porous biogenetic silica particles with its attendant disadvantages.

In the following examples, all percentages are by weight, except as otherwise indicated.

EXAMPLE 1

A mixture comprising 79 percent biogenetic silica particles (rice hull ash), 20 percent water and 1 percent of a starch-acrylonitrite graft copolymer was prepared. The material was a loose aggregate with the ability to flow into open areas. The material was poured into the cavity of a double walled vessel and gently packed in place sufficiently to form a continuous mass without substantial compaction or densification. Upon air drying for 48 hours, the material was firmly held in place and exhibited good insulation properties at high temperatures up to 500° F. and low temperatures to −200° F.

EXAMPLE 2

A solid board of insulation was made by mixing isocyanate with a blend of polyols in a mixer, then immediately adding biogenetic silica particles (rice hull ash) to the vicious liquid in a pug mill. This was done with a continuous feed using a metering screw to add the biogenetic silica ash. Also, the biogenetic silica particles were added within seconds of the time that the other chemicals were mixed since they are the basic ingredients of urethane and become solid within about 30 seconds. The foaming was unconfined and without external pressure thus resulting in an insulation which was not densified. After foaming and solidifying, the material was analyzed and found to contain 41 percent biogenetic silica, and had a very high porosity of 75% by volume. Thermal resistance was then checked and compared to a similar urethane formula insulation without the addition of biogenetic silica. The thermal resistance was found to be about 10.7 for a 3 inch thick sample in each instance. This indicates that the insulation containing the particles of biogenetic silica possesses approximately the same insulating capability as a stable foam when encompassed in a foam structure such as urethane foam, but is considerably less expensive to make and does not support combustion as does the urethane foam insulation without the particles of porous biogenetic silica.

EXAMPLE 3

A series of samples were prepared by the technique of Example 2 with the amount of biogenetic silica particles varied from 10–60 percent of the mixture. Above 50 percent, clinkers were formed and the thermal resistance was reduced. Thus the preferred range for biogenetic silica bound into a stable foam is 10–50 percent. Also, in all samples in which the biogenetic silica was over one third of the total mixture, the combustability of the foam was greatly reduced. Where a flame was held to the samples, there was charring but no continued burning when the flame was removed from samples containing 30 percent or greater biogenetic silica.

EXAMPLE 4

A mixture was prepared containing 95 percent biogenetic silica particles (rice hull ash) and 5 percent of a commercial epoxy cement. This mixture was vigorously stirred to obtain uniformity. No pressure was applied to the mixture which was then used to coat a section of 4" PVC pipe. The thickness of the coating was about 1 inch and the coating had a porosity of about 70% by volume. There was a very noticeable temperature difference between the coated and non-coated pipe sections when either hot or cold liquids were poured through the pipe.

There are numerous adhesives that are commercially available that may be used with biogenetic silica particles which physically bind the particles together and do not react chemically with the particles to form heat flow channels, as previously set forth. Viscous liquids are preferred to prevent filling pores of the biogenetic silica which would reduce insulating properties.

EXAMPLE 5

In this example other biogenetic silica particles were substituted for rice hull silica and the insulating compositions and methods of examples 1–4, inclusive, were made as there set forth with substantially the same results. These are ash from rice stalks, equisetum (horsetail weeds), bamboo and palm leaves. The porosities of these insulations ranged from about 60% to 85% by volume.

Thus, by the present invention biogenetic silica particles of high porosity having organic or fibrous material removed, such as by burning, and in amorphous state are bound together or placed in spaces or bound to surfaces in an undensified, high porosity manner so that the heat transfer properties of particles are not materially affected thereby providing an effective insulation which is fire resistant and retardant, and poses no health hazards or problems in its manufacture.

The present invention, therefore, is well suited and adapted to attain the ends and objects and has the advantages mentioned as well as others inherent therein.

While presently preferred embodiments of the invention have been given for the purpose of disclosure, changes may be made therein which are within the spirit of the invention as defined by the scope of the appended claims.

I claim:

1. An insulation material comprising,
   particles of biogenetic silica in amorphous state and having a substantially porous structure bound together by a physical binder effective to provide bonds which pull the particles together without compaction,
   the physical binder being effective and present in an amount effective to so bind the particles together in a rigid structure without substantially filling voids of the particles thereby not substantially reducing the porosity of the particles, and
   the insulation material having a porosity of at least 60% by volume.
2. The insulation material of claim 1 where,
   the biogenetic silica is rice hull ash.
3. The insulation material of claim 1 where,
   the binder is foamed urethane, and
   the particles of biogenetic silica are dispersed in uncompacted state throughout the foamed urethane.
4. The insulation material of claim 2 where,
   the biogenetic silica is rice hull ash, and
   the particles of biogenetic silica are dispersed in uncompacted state throughout the foamed urethane.
5. The insulation material of claim 1 where,
   the binder is urethane foam,
   the biogenetic silica is rice hull ash, and
   from about 10% to about 50% by weight of the rice hull ash is distributed in uncompacted state throughout the urethane foam.

6. The insulation material of claim 1 where,
the insulation is in the form of a rigid porous structure, and
the particles of biogenetic silica are distributed throughout in uncompacted state.

7. The insulation material of claim 6 where,
the biogenetic silica is rice hull ash.

8. A method of insulating a structure comprising,
applying biogenetic silica particles in amorphous state and having a substantially porous skeleton into spaces in the structure, the biogenetic silica particles being uncompacted.

9. The method of claim 8 where, the biogenetic silica is rice hull ash.

10. The method of claim 8 including,
evacuating air from the space after flowing the particles of biogenetic silica into the space.

11. The method of claim 10 where,
the biogenetic silica is rice hull ash.

12. The method of claim 8 where,
the biogenetic silica is applied with up to about 5% adhesive binder, the adhesive binder effective to bind the biogenetic silica particles together without substantially changing their porosity and forming heat bridges:

13. The method of claim 12 where,
the biogenetic silica is rice hull ash.

14. A method of making an insulation comprising,
physically binding together particles of biogenetic silica in amorphous state and having a substantially porous structure, the binder being present in an amount sufficient to bind the particles into a porous solid insulation and effective to bind the particles together without compaction and without substantially filling voids in the porous structure, thereby not materially altering the porosity of the particles.

15. The method of claim 14 where,
the biogenetic silica is rice hull ash.

16. A method of making a porous foamed insulation comprising,
blending between about 10% to about 50% by weight of particles of biogenetic silica in amorphous state with substantially porous structures with urethane precursors when mixing them and before foaming, and
foaming the resulting mixture without densifying the resulting porous foamed insulation.

17. The method of claim 16 where,
the biogenetic silica is rice hull ash.

18. A method of insulating a surface of a structure comprising,
applying particles of biogenetic silica in amorphous state having substantially porous structures to the surface with a physical binder in an amount and effective to bind the particles to the surface in uncompacted state and without filling voids of the particles of biogenetic silica thereby not materially reducing their porosity.

19. A method of producing a rigid, porous insulation comprising,
mixing a dilute aqueous solution of a water soluble binder with particles of biogenetic silica in amorphous state having substantially porous structures,
the binder effective and in an amount to provide physical bonds which on drying pull the particles together without compaction, do not fill voids of the particles thereby not materially reducing porosity of the particles, and which is effective to bind the particles together on drying in a rigid structure, and
drying the mixture of binder and particles.

20. The method of claim 19 where,
the biogenetic silica is rice hull ash.

21. A rigid insulation comprising,
particles of porous biogenetic silica in amorphous state rigidly bonded together by a water-soluble binder without compaction, and
the rigid insulation having a porosity of at least about 60% by volume.

22. The rigid insulation of claim 21 where,
the particles of porous biogenetic silica are rice hull ash.

* * * * *

UNITED STATES PATENT OFFICE
CERTIFICATE OF CORRECTION

Patent No. 4,555,448      Dated November 26, 1985

Inventor(s) Robert L. Durham

It is certified that error appears in the above-identified patent and that said Letters Patent are hereby corrected as shown below:

Column 7, line 23, change "vicious" to --viscous--.

Signed and Sealed this

Twenty-fifth Day of March 1986

[SEAL]

Attest:

DONALD J. QUIGG

Attesting Officer      Commissioner of Patents and Trademarks